Figure 1:
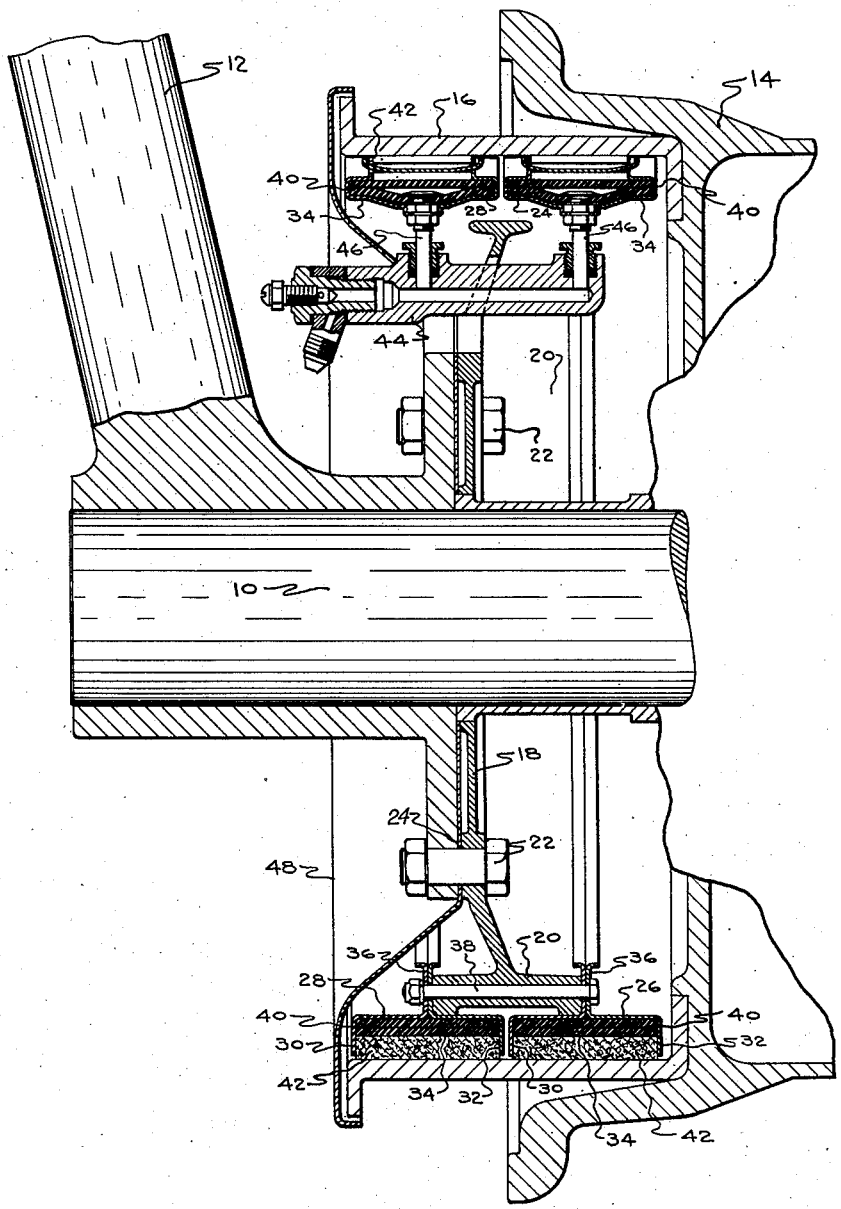

May 30, 1944.  C. HOLLERITH  2,350,038
BRAKE STRUCTURE
Filed May 24, 1939  4 Sheets-Sheet 1

Inventor
CHARLES HOLLERITH
By Beaman & Langford
Attorneys

May 30, 1944. C. HOLLERITH 2,350,038
BRAKE STRUCTURE
Filed May 24, 1939 4 Sheets-Sheet 2

Inventor
CHARLES HOLLERITH
By Beaman & Langford
Attorneys

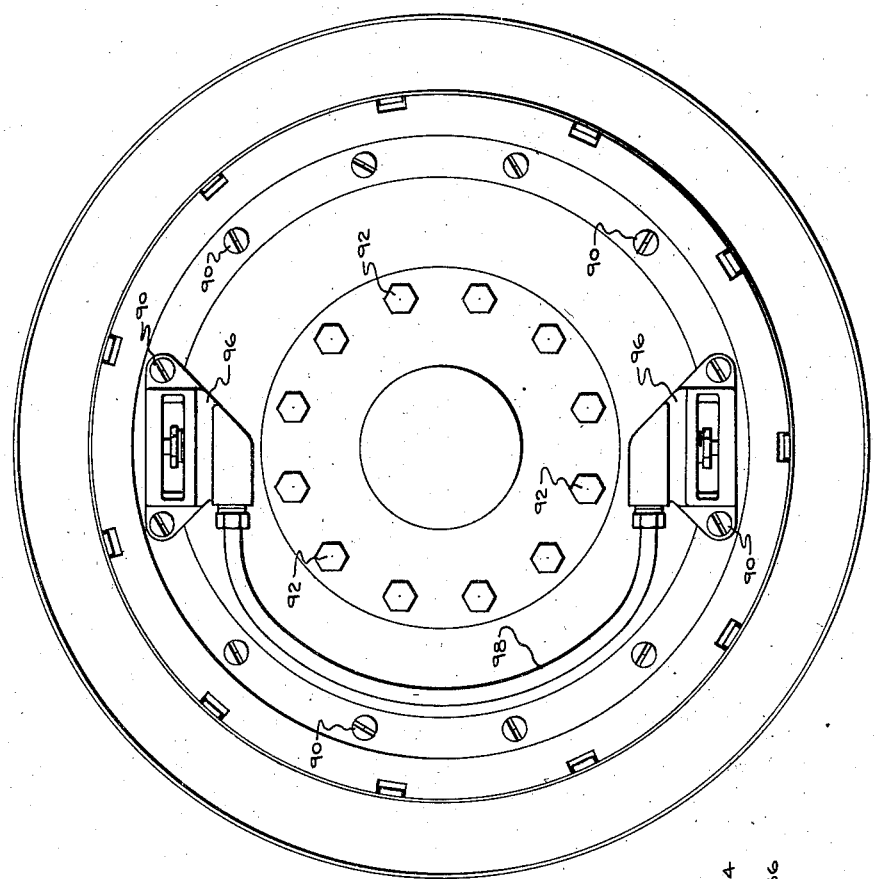
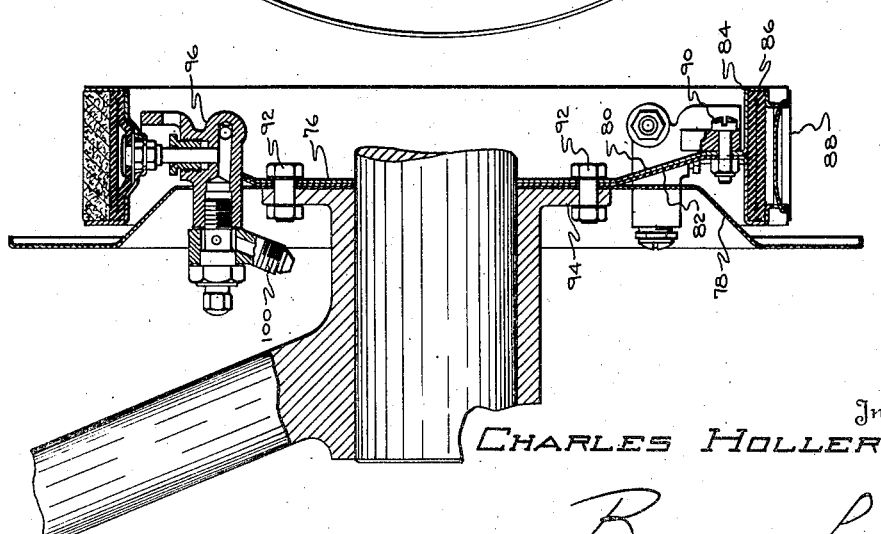

May 30, 1944. C. HOLLERITH 2,350,038
BRAKE STRUCTURE
Filed May 24, 1939 4 Sheets-Sheet 4

Inventor
CHARLES HOLLERITH
By Beaman & Langford
Attorneys

Patented May 30, 1944

2,350,038

UNITED STATES PATENT OFFICE 2,350,038

BRAKE STRUCTURE

Charles Hollerith, Jackson, Mich., assignor to Hayes Industries, Inc., Jackson, Mich., a corporation of Michigan Application May 24, 1939, Serial No. 275,355

12 Claims. (Cl. 188—152)

The present invention relates to brake mechanism, being particularly concerned with brakes for the landing gear of airplanes. The principles of the invention, however, having general application in the field of brake mechanism.

It is one of the objects of the present invention to reduce the cost and simplify the manufacture of brakes by a design in which sheet metal stampings replace cast parts requiring expensive machining operation.

Another object is to provide a brake mechanism of the expanded tube type in which the means of assembling the brake element and retraction springs has been materially simplified.

Another object resides in providing a brake mechanism in which stamped parts forming the braking element supporting structure and the fairing collectively form a rigid torque plate.

A further object resides in the provision of retraction springs for the brake element which may be assembled and disassembled without disassembling the supporting structure for the brake elements.

Other objects and advantages residing in the arrangement, construction and combination of parts will appear from the detailed description to follow and the appended claims.

Figure 2:
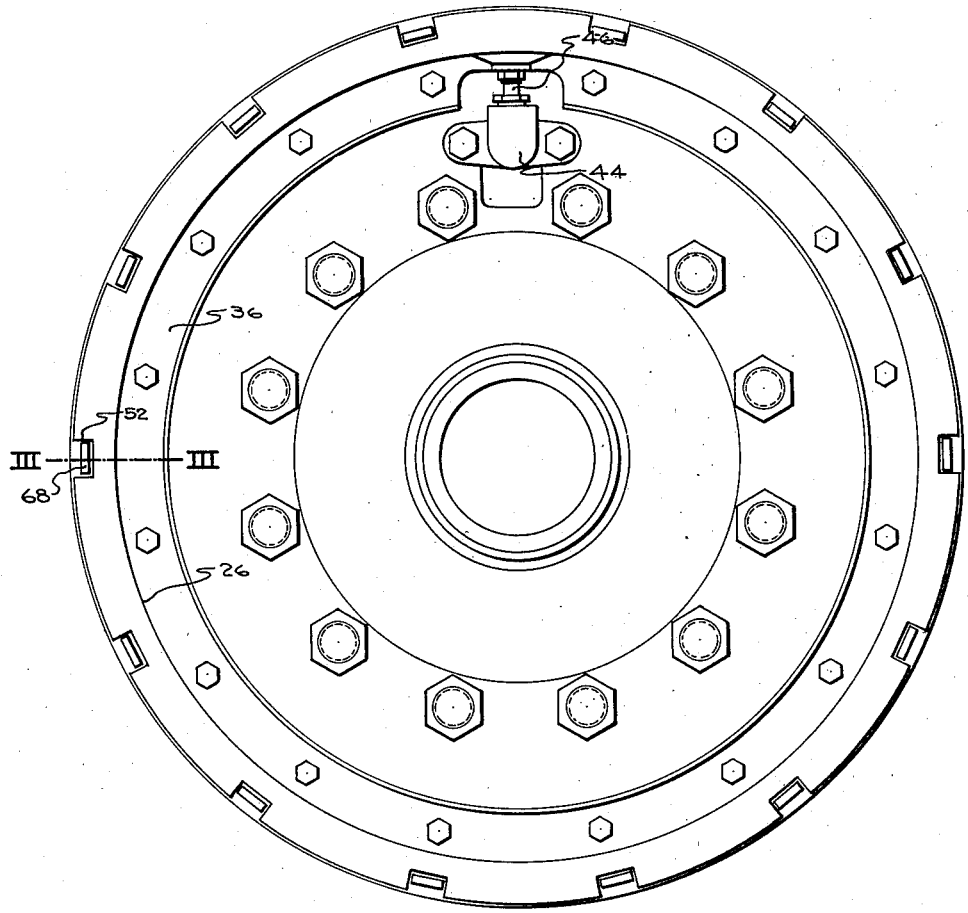
Figure 4:
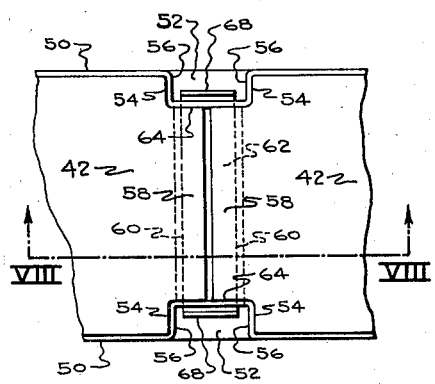
Figure 3:
Figure 7:
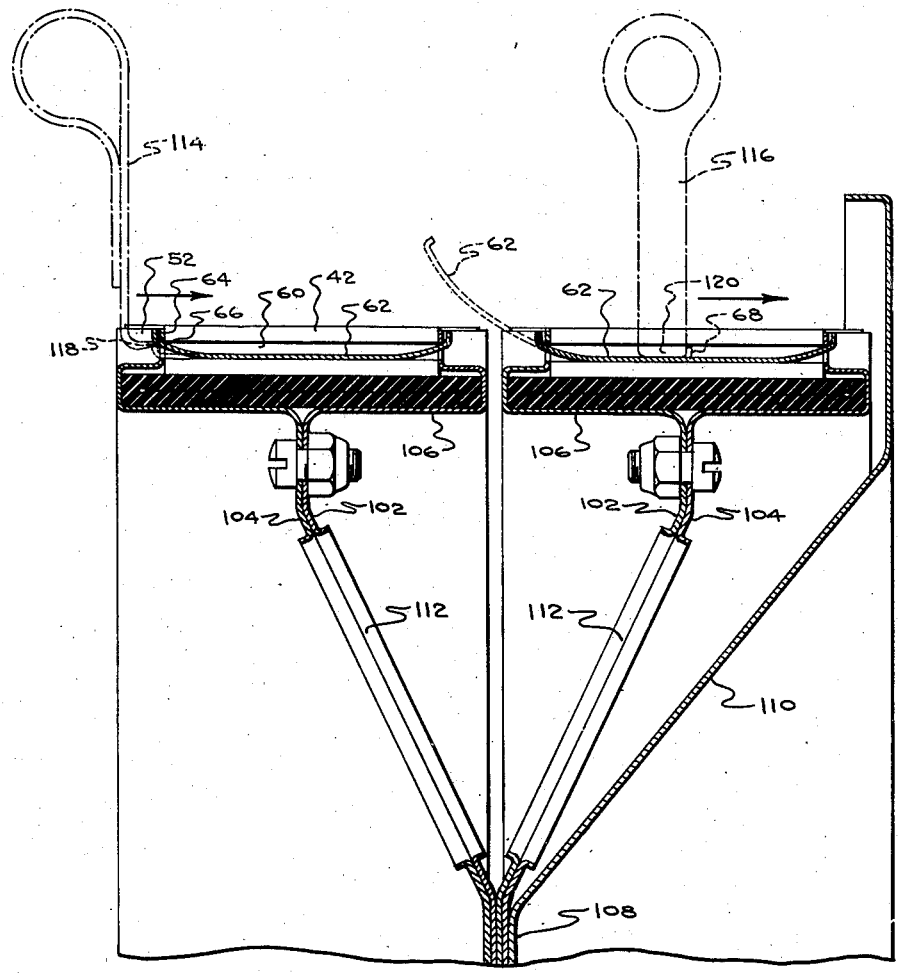
Figure 8:
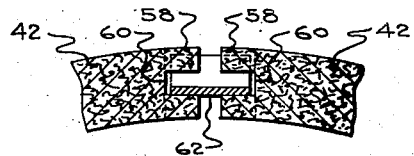

In the drawings,

Fig. 1 is a partial vertical cross-sectional view of a landing gear embodying my improved brake construction, Fig. 2 is a side elevational view of the brake mechanism shown in Fig. 1 removed from the torque flange, Fig. 3 is a cross-sectional view taken on line III—III of Fig. 2 showing the brake element and retractor spring assembly, Fig. 4 is a fragmentary plan view of the brake element and retractor spring assembly, Fig. 5 is a view similar to Fig. 1 of a single unit brake, Fig. 6 is an elevational view of the construction shown in Fig. 5 as viewed from the right, Fig. 7 is a fragmentary cross-sectional view of a modified form of the dual brake construction shown in Fig. 1 showing a method of removal and insertion of retractor springs, and Fig. 8 is a cross-sectional view taken on line VIII—VIII of Fig. 4.

In order that the principles of the present invention may be fully understood, its application to three different brake mechanisms primarily designed for airplane wheels is herein shown. It is to be understood, however, that the invention is not limited to airplane wheels nor restricted to expander tube actuated brakes.

Referring to Fig. 1, the axle 10 of the landing gear 12 gives rotatable support to the wheel 14 having a brake drum 16. The form of my improved brake structure illustrated comprises a rigid torque plate 18 shown as of cast construction with a T-shaped rim flange 20. Bolts 22 removably secure the torque plate 18 to the torque flange 24 of the landing gear. The dual brake shown has two channel parts 26 and 28 fabricated from sheet metal. As shown the parts 26 and 28 comprise similar stampings 30 and 32, collectively defining webs 34 and radial flanges 36. Bolts 38 secure the channel parts 26 and 28 to the rim flange 20. The expander tubes 40 radially urge the brake blocks 42 into contact with the brake drum 16 at the time fluid pressure is directed through the distributor 44 and conduits 46 communicating with the interior of the tubes 40. A fairing 48 encases the outside of the brake assembly, being conveniently supported between the plate 18 and the flange 24.

As more clearly shown in Figs. 2, 3 and 4, the spaced radial rims 50 of the channels 26 and 28 are formed with indentations 52 which lock the brake blocks 42 against circumferential movement. Referring more specifically to Fig. 4, the brake blocks 42 having shoulder portions 54 which abut the right angle shoulder 56 of the indentation 52. Each end of each brake block 42 has a tongue portion 58 which is channeled at 60 to receive springs 62. The webs 64 of each indentation 52 are slotted at 66 to receive the opposite ends of the springs 62. As shown in Fig. 3 the ends of each spring 62 are turned up at 68 to prevent axial displacement of the spring 62 which is bowed when unstressed and functions in the channels 60 of the adjacent brake block 42 to retract the same following outward radial movement following inflation of the tube 40. Preferably the radial width of the opposed channels 60, which collectively provide the slots for the springs 62, is substantially the same as the radial width of the slots 66 with the dimension of the turned ends 68 of the springs 62 slightly less than the radial width of both the channels 60 and the slots 66. This arrangement enables the springs 62 to be inserted by an endwise movement with the brake block 42 in position on the rims 30 and 32. It will be understood that the springs 62 hold the brake block 42 to the rims 30 and 32 in addition to retracting the same to provide clearance with the brake drum following the radial displacement that takes place when the expander tubes 40 are inflated. As more clearly shown in Fig. 8, the spring 62 has clearance at the sides with the channel 60 to avoid the possibility of the thrust upon the brake block being taken through the spring 62.

In Fig. 5, the principles of the invention are shown in connection with a single unit brake. As shown the torque plate and brake block retaining rim are integrally fabricated from a pair of sheet metal stampings in lieu of the multi-part construction of Fig. 1. Referring to the drawings, the central portion of the torque plate 76 comprises three separate sheet metal stampings, one stamping being that of the fairing 78, and the others the stamped parts 80 and 82 which collectively define the channeled rim 84 in which the expander tube 86 and brake block 88 are assembled as heretofore described. The parts 80 and 82 are bolted together at 90. All three stampings are bolted at 92 to the torque flange 94 of the landing gear and when so connected collectively provide a rigid torque plate. To facilitate the inflation and deflation of the tube 88 a pair of distributors 96 are shown in Fig. 6 as diametrically located with a conduit 98 for distributing the fluid entering and exhausting through the common connection 100. This arrangement enhances the rapidity of operation of the brakes.

It should be apparent to those skilled in the art of metal stamping that with the construction shown in Figs. 1 and 5, the same die may be used for brakes of different width, but the same diameter. That is, the width of the web 32 of the channel may be varied by regulating the depth of the draw.

Fig. 7 illustrates a practical modification of the construction shown in Fig. 1. In lieu of the cast torque plate 18 having a T-shaped rim flange 20, the stampings 102 and 104 collectively defining the channel 106, have central web portions converging toward the center line of the assembly to form the laminated torque plate 108 which is bolted to the torque flange of the landing gear in the manner shown in Fig. 1, together with the fairing 110. To lighten the construction, circumferentially spaced openings 112 are provided.

In Fig. 7, in dotted line representation, tools 114 and 116 are shown used in a manner to insert and remove the retractor springs 62. The tool 114 has a stepped nose portion 118 which enables the end of the spring 62 to be depressed to clear the web 64 of the depression 52 and then to be moved endwise to the right through the slot 66 into the channels 60. This will project the opposite end of the spring 62 where it may be conveniently acted upon to complete the withdrawal. The tool 116 at its end 120 is sufficiently thin to be projected between the opposed ends of adjacent brake blocks to engage the turned end 68 of the partially inserted spring 62 shown drawing the same into the full line position shown through movement to the right. The ability to insert and remove the spring 62 as just described enables the brake blocks to be removed and replaced without disassembly or alteration of the brake block supporting structure or removal of the fairing 110.

Having described my invention, what I desire to protect by Letters Patent and claim is:

1. In a brake mechanism, a multi-part sheet metal torque plate comprising a fairing and a pair of substantially identical members in reverse relation collectively defining a brake element supporting rim, said fairing and members having central portions in contiguous relation collectively defining torque plate, the central portions of said members being substantially spaced from the rim portion defined thereby and in combination with the fairing solely constituting the torque plate for the brake mechanism.

2. An expanded tube brake structure comprising a radially outward opening channel shaped rim in which the expanded tube and radially actuated brake elements are assembled, said rim being fabricated from a pair of sheet metal members, each member having a radial flange constituting one side of the channel and a portion angularly disposed thereto which forms, with a similar portion of the other of said members, the web of said channel, said radial flange being inwardly indented at equally spaced opposed points therealong to provide indentation having shoulder portions within the channel inwardly spaced from said flanges and angularly disposed thereto, aligned openings in opposed indentations, retractor springs having their ends anchored in said openings, and brake blocks disposed in said rim and having endwise abutting engagement with said indentations, said springs overlying portions of said blocks adjacent the ends thereof.

3. In a brake structure, a brake block supporting structure including a rim having spaced radial flange portions, radially actuated brake blocks disposed between said flanges and guided thereby, opposed openings defined at spaced points along said flange portions, spring metal strips for retracting the brake block having opposite ends extending through said openings, said strips at their outer end having offset portions which engage with said flanges at one side of said openings to hold said strips against lengthwise displacement, said blocks having a surface thereof in substantial alignment with said opposed openings with which said spring strips engage intermediate their ends to urge the brake block radially inward, the depth of said openings and the clearance about said surface of said block being greater than the corresponding dimension of said spring strips and offset portions whereby said spring strips may be inserted and withdrawn with the brake block in assembled relation on said rim.

4. In a brake construction, the combination with a circular channel shaped rim having radial flanges, of a plurality of arcuate brake blocks supported in said rim in end to end relation, the ends of said blocks being grooved to collectively define a transverse slot, corresponding opposed slots defined in said flanges aligned with said first slot, an arcuate spring metal strip disposed in said first slot with its ends projected through said second slots, said strip having its ends deformed to prevent lengthwise displacement of the strip from said slot with said strip in arcuate form, the overall radial dimension of said strip being less than corresponding dimension of said slots whereby said strip may be inserted and removed from said slots upon being substantially flattened.

5. In a brake construction, a circular rim part, arcuate brake blocks adapted to be assembled and radially actuated upon said rim, and removable transverse retractor springs directly connected to said rim and directly acting between the said rim and blocks, said springs constituting the sole assembling means for said block upon said rim, said rim having transverse openings for the removal and insertion of said springs without disassembling said rim.

6. In a brake construction, the combination with a rim part having spaced retractor spring anchoring parts, a removable brake block supported upon said rim and positioned between said anchoring parts, aligned openings defined in said anchoring parts and said brake block, a retractor spring insertable through said aligned openings by endwise movement, engaging portions on said spring and said anchoring part to prevent accidental removal of said spring and held in engagement by the resiliency of the spring, said spring having sufficient clearance in said openings to enable disengagement of said engaging portions upon predetermined spring deflection for endwise removal.

7. In a brake construction, a circular rim part for the supporting and positioning of a plurality of arcuate brake elements, fixed points of anchorage along said rim part upon opposite sides of the supporting brake element between which the same are radially moved, a retractor spring overlying a portion of said brake element and connected to said point of anchorage and constituting the sole assembling means for said brake element upon said rim, said spring being moved endwise for insertion and removal relative to the aforesaid structure whereby said brake element may be removed and replaced without altering or disassembling said rim part.

8. In a brake construction, a pair of laterally spaced channel shaped rims of sheet metal for supporting the brake elements and having inwardly extending attachment portions, and a common torque structure for said pair of rims, said structure having a central radial web portion and an outer rim portion, said outer rim portion having a width approximating that of said rims, said first rims being piloted upon said outer rims, and means for connecting said inwardly extending portions of said first rims to opposite sides of said torque structure outer rim.

9. In a brake construction, a pair of brake elements supporting rim parts, each of said parts being from two sheet metal portions shaped at their outer periphery to receive the brake element and having central web portions in juxtaposition, the central webs of at least one of said rim parts being offset sufficiently to enable all the web portion to be in juxtaposition to collectively define a torque plate.

10. A brake structure of stamped sheet metal construction comprising a channel shaped rim part for supporting the brake shoe and a torque transmitting two-ply web, said rim part and web consisting solely of two stampings secured together into a unit, said rim part being collectively formed by L-shaped portions of said stampings, said two-ply web being formed from radial portions of said stampings in direct back to back relation, means securing said stampings together as a unit adjacent said rim part, and mounting structure for connecting said torque web to a supporting structure substantially spaced inwardly from said means.

11. In a brake construction, a pair of sheet metal stampings collectively defining a circular channel shaped rim part for the brake element and a torque transmitting plate for attachment to the torque flange of a vehicle frame, the rim defining portions of said stampings being complementary in shape, the torque plate defining portions of said stampings being shaped for back to back association to form a two-ply plate extending inwardly from the central part of said rim to a center attachment portion substantially spaced from said rim part, and means securing said stampings together as a unit adjacent said rim part.

12. In a brake construction, a circular rim part, arcuate brake blocks adapted to be assembled and radially actuated upon said rim, removable retractor springs directly connected to side portions of said rim and acting upon said blocks, said springs constituting the sole assembling means for said block upon said rim, and openings in said side portions for the transverse insertion and removal of said springs without disassembling said rim.

CHARLES HOLLERITH.